(12) United States Patent
Liang et al.

(10) Patent No.: US 10,359,868 B2
(45) Date of Patent: Jul. 23, 2019

(54) METHOD AND APPARATUS FOR CONTROLLING OBJECT MOVEMENT ON SCREEN

(71) Applicant: PixArt Imaging Incorporation, R.O.C., Hsin-Chu (TW)

(72) Inventors: Chia-Cheun Liang, Hsin-Chu (TW); Yi-Hsien Ko, Hsin-Chu (TW)

(73) Assignee: PIXART IMAGING INCORPORATION, Hsin-Chu (TW)

( * ) Notice: Subject to any disclaimer, the term of this patent is extended or adjusted under 35 U.S.C. 154(b) by 0 days.

(21) Appl. No.: 15/641,852

(22) Filed: Jul. 5, 2017

(65) Prior Publication Data

US 2017/0300131 A1    Oct. 19, 2017

Related U.S. Application Data

(63) Continuation of application No. 14/031,841, filed on Sep. 19, 2013, now Pat. No. 9,727,152.

(51) Int. Cl.
*G06F 3/038* (2013.01)
*G06F 3/033* (2013.01)
*G06F 3/0354* (2013.01)
*G06F 3/03* (2006.01)
*G06F 3/048* (2013.01)

(52) U.S. Cl.
CPC .............. *G06F 3/038* (2013.01); *G06F 3/033* (2013.01); *G06F 3/0317* (2013.01); *G06F 3/0354* (2013.01); *G06F 3/03543* (2013.01); *G06F 3/048* (2013.01)

(58) Field of Classification Search
CPC ...... G06F 3/038; G06F 3/048; G06F 3/03543; G06F 3/0317; G06F 3/033; G06F 3/0354
See application file for complete search history.

(56) References Cited

U.S. PATENT DOCUMENTS

| | | | | |
|---|---|---|---|---|
| 4,972,496 A | * | 11/1990 | Sklarew | G06F 3/033 345/178 |
| 5,398,044 A | * | 3/1995 | Hill | G06F 3/038 345/157 |
| 5,615,283 A | * | 3/1997 | Donchin | G06K 9/00416 382/187 |
| 5,734,373 A | * | 3/1998 | Rosenberg | A63F 13/06 345/161 |
| 5,793,354 A | * | 8/1998 | Kaplan | G06F 3/033 345/157 |
| 6,057,826 A | * | 5/2000 | Gaultier | G06F 3/033 341/34 |

(Continued)

*Primary Examiner* — Jose R Soto Lopez
(74) *Attorney, Agent, or Firm* — Tung & Associates

(57) ABSTRACT

The present invention discloses a method and apparatus for controlling an object movement on a screen. The method senses a first change in a position of a pointing device in a coordinate system to obtain a first displacement, and controls the object movement by a first displacement output ratio according to the first displacement. The method senses a second change in a position of the pointing device in a coordinate system to obtain a second displacement, and controls the object movement by a second displacement output ratio when a difference between a direction of the first displacement and a direction of the second displacement exceeds a first angle threshold, wherein the second displacement output ratio is lower than the first displacement output ratio.

16 Claims, 6 Drawing Sheets

(56) References Cited

U.S. PATENT DOCUMENTS

| | | | | |
|---|---|---|---|---|
| 6,057,845 A * | 5/2000 | Dupouy | G06F 3/0481 | 382/186 |
| 6,249,606 B1 * | 6/2001 | Kiraly | G06F 3/04883 | 345/156 |
| 6,275,611 B1 * | 8/2001 | Parthasarathy | G06K 9/4604 | 382/187 |
| 6,307,536 B1 * | 10/2001 | Hada | B62D 6/002 | 345/157 |
| 6,466,199 B2 * | 10/2002 | Takase | G06F 3/038 | 345/157 |
| 6,489,948 B1 * | 12/2002 | Lau | G06F 3/03543 | 345/159 |
| 6,664,989 B1 * | 12/2003 | Snyder | G06F 3/038 | 715/856 |
| 6,747,680 B1 * | 6/2004 | Igarashi | G06F 3/0485 | 345/159 |
| 7,079,116 B2 * | 7/2006 | Park | G06F 3/0317 | 178/18.01 |
| 7,173,637 B1 * | 2/2007 | Hinckley | G06F 3/0362 | 345/684 |
| 7,545,362 B2 * | 6/2009 | Kong | G06F 3/0338 | 345/158 |
| 8,155,255 B2 * | 4/2012 | Chen | G06F 3/038 | 348/162 |
| 8,169,420 B2 * | 5/2012 | Lee | G06F 3/0317 | 345/166 |
| 8,698,746 B1 * | 4/2014 | Merrick | G06F 3/038 | 178/19.05 |
| 8,704,765 B1 * | 4/2014 | Murphy | G06F 3/038 | 345/157 |
| 9,041,650 B2 * | 5/2015 | Amm | G06F 3/017 | 345/163 |
| 9,213,482 B2 * | 12/2015 | Mai | G06F 3/04883 | |
| 2002/0141643 A1 * | 10/2002 | Jaeger | G06F 3/0481 | 382/181 |
| 2004/0091165 A1 * | 5/2004 | Park | G06F 3/0317 | 382/260 |
| 2006/0007140 A1 * | 1/2006 | Suzuki | G06F 3/038 | 345/157 |
| 2006/0066570 A1 * | 3/2006 | Trifilo | G06F 3/0338 | 345/157 |
| 2006/0226345 A1 * | 10/2006 | Afriat | G06F 3/0317 | 250/221 |
| 2008/0007519 A1 * | 1/2008 | Mellot | G06F 3/03543 | 345/156 |
| 2008/0062131 A1 * | 3/2008 | Chan | G06F 3/0317 | 345/166 |
| 2008/0122806 A1 * | 5/2008 | Ahn | G06F 3/0236 | 345/179 |
| 2008/0158436 A1 * | 7/2008 | Chao | G06F 3/0325 | 348/734 |
| 2008/0168893 A1 * | 7/2008 | Nakamura | G10H 1/18 | 84/645 |
| 2008/0174787 A1 * | 7/2008 | Teo | G01S 17/50 | 356/614 |
| 2009/0146953 A1 * | 6/2009 | Lou | G06F 3/0346 | 345/163 |
| 2009/0160774 A1 * | 6/2009 | Lee | G06F 3/03543 | 345/166 |
| 2009/0309830 A1 * | 12/2009 | Yamamoto | G06F 3/0346 | 345/156 |
| 2010/0110001 A1 * | 5/2010 | Yamamoto | G06F 3/017 | 345/156 |
| 2010/0169824 A1 * | 7/2010 | Sawai | G06F 3/0346 | 715/784 |
| 2010/0253619 A1 * | 10/2010 | Ahn | G06F 3/012 | 345/157 |
| 2011/0050566 A1 * | 3/2011 | Sawai | G06F 3/033 | 345/157 |
| 2011/0102570 A1 * | 5/2011 | Wilf | G06F 3/017 | 348/77 |
| 2012/0092252 A1 * | 4/2012 | Su | G06F 3/038 | 345/157 |
| 2012/0105329 A1 * | 5/2012 | Chang | G06F 3/03543 | 345/163 |
| 2012/0218185 A1 * | 8/2012 | Chen | G06F 3/03543 | 345/163 |
| 2012/0274558 A1 * | 11/2012 | Broms | G06F 3/038 | 345/157 |
| 2012/0293456 A1 * | 11/2012 | Ikeda | G06F 1/1626 | 345/174 |
| 2013/0002600 A1 * | 1/2013 | McCracken | G06F 3/044 | 345/174 |
| 2013/0058569 A1 * | 3/2013 | Kawano | H04N 1/40075 | 382/165 |
| 2013/0063374 A1 * | 3/2013 | Lee | G06F 3/038 | 345/173 |
| 2013/0076628 A1 * | 3/2013 | Lin | G06F 3/03543 | 345/163 |
| 2013/0093674 A1 * | 4/2013 | Fei | G06F 3/033 | 345/158 |
| 2013/0120248 A1 * | 5/2013 | Gilra | G06F 3/04812 | 345/157 |
| 2013/0127738 A1 * | 5/2013 | Miller | G06F 3/0488 | 345/173 |
| 2015/0130720 A1 * | 5/2015 | Zhao | G06F 3/005 | 345/166 |

* cited by examiner

METHOD AND APPARATUS FOR CONTROLLING OBJECT MOVEMENT ON SCREEN

CROSS REFERENCE

This is a Continuation of a co-pending application Ser. No. 14/031,841, filed on Sep. 19, 2013.

BACKGROUND OF THE INVENTION

Field of Invention

The present invention relates to a method and an apparatus for controlling an object movement on a screen; particularly, it relates to such method and apparatus capable of adjusting the movement and the positioning of the cursor.

Description of Related Art

Currently, if a user intends to open a file in a computer, he or she usually controls a cursor with a computer input device and clicks an icon corresponding to the file on a computer screen to open it. A mouse is one type of the most often used computer input device. The mouse can control the position of the cursor on the computer screen and select an icon on the screen or trigger a corresponding function represented by the icon by clicking its button. In addition to controlling the cursor by the mouse, the cursor can also be controlled through a touch panel or a writing board. Such computer input devices capable of controlling the movement of the cursor are hereinafter referred as "pointing devices"). To control a cursor, it is required to calculate the position of the cursor. Taking an optical mouse as an example, the conventional approach for calculating the cursor position is to first determine the brightness of the pixels, and then use the pixels whose brightness is larger than a threshold as a basis for calculation. The calculation of the cursor position is carried out by taking the brightness of the pixels as a weighting factor, to obtain the gravity center of the pixels as the position of the cursor.

When controlling the cursor, the user must precisely move the cursor to the desired icon so as to execute the program or open the file. Usually, the resolution of the screen is high; therefore, a high accuracy is required for positioning the cursor, leading to the high resolution requirement of the pointing device. Taking an optical mouse as an example, because the position of the cursor is obtained by calculating the gravity center or centroid of the pixels, wherein the brightness of the pixels is taken into account, the high resolution requirement leads to more complicated calculation. If the pointing device can adopt a structure with low resolution, its cost can accordingly be reduced. However, because of the low resolution, the calculation may not be able to precisely position the cursor. For example, assuming that the ratio of the resolution of the pointing device to that of the screen is 1:8, when the user moves the pointing device by one unit (e.g., in the case that the pointing device is an optical mouse, one unit represents one pixel on the image sensor), the cursor correspondingly moves by eight units (e.g., eight pixels) on the screen. In other words, one unit for the pointing device corresponds to eight units for the screen. Under such circumstance, if the difference between the current position and the position where the user intends to move to is smaller than eight units, the user will be unable to arrive at the desired cursor position no matter how the user move the pointing device back and forth.

In view of the above, to overcome the drawbacks in the prior art, the present invention proposes a method and an apparatus for controlling an object movement on a screen, which is capable of positioning the object on the screen precisely even though the pointing device, as compared with the screen, has a lower resolution. The object on the screen can be, for example but not limited to, the above-mentioned cursor, or any other objects such as roles or equipments in an electronic game.

SUMMARY OF THE INVENTION

A first objective of the present invention is to provide a method for controlling an object movement on a screen.

A second objective of the present invention is to provide an apparatus for controlling an object movement on a screen.

To achieve the above and other objectives, from one perspective, the present invention provides a method for controlling an object movement on a screen by different displacement output ratios, wherein the displacement output ratio is a ratio between a displacement of a pointing device and a displacement of the object movement, the method comprising: (A) sensing a first change in a position of the pointing device in a coordinate system to obtain a first displacement; (B) controlling the object movement by a first displacement output ratio according to the first displacement; (C) sensing a second change in the position of the pointing device in the coordinate system to obtain a second displacement; and (D) controlling the object movement by a second displacement output ratio when a difference between a direction of the first displacement and a direction of the second displacement exceeds a first angle threshold, wherein the second displacement output ratio is lower than the first displacement output ratio.

In one embodiment, whether the difference between the direction of the first displacement and the direction of the second displacement exceeds the first angle threshold is determined by: judging whether the direction of the first displacement and the direction of the second displacement has an angle in between which is larger than the first angle threshold, wherein the first angle threshold is for example but not limited to 90 degrees.

In another embodiment, whether the difference between the direction of the first displacement and the direction of the second displacement exceeds the first angle threshold is determined by: judging whether the second displacement, as compared with the first displacement, is changed to an opposite direction in at least one dimension of the coordinate system.

In yet another embodiment, the method further comprises: controlling the object movement by the second displacement output ratio for a predetermined time period after the step (D), or for a time period in which the pointing device does not cease changing its position after the step (D).

In still another embodiment, the method further comprises: (E) sensing a third change in the position of the pointing device in the coordinate system to obtain a third displacement; and (F) controlling the object movement by a third displacement output ratio when a difference between a direction of the second displacement and a direction of the third displacement exceeds a second angle threshold, wherein the third displacement output ratio is lower than the second displacement output ratio. The second angle threshold can be equal to or different from the first angle threshold.

In another embodiment, the method further comprises: changing the second displacement output ratio to the first displacement output ratio after the step (D) when one or more of the following conditions occur: (1) the pointing device ceasing changing its position within a first predetermined time period; (2) receiving other control information which is not the position of the pointing device; (3) remaining at the second displacement output ratio for a second predetermined time period; and/or (4) the pointing device moving continually within a third predetermined time period and a change in a moving direction of the pointing device does not exceed a third angle threshold.

From another perspective, the present invention provides an apparatus for controlling an object movement on a screen by different displacement output ratios, wherein the displacement output ratio is a ratio between a displacement of a pointing device and a displacement of the object movement, the apparatus, comprising: an image displaying unit for displaying an object on the screen; a pointing device including a sensor, for sensing changes in positions of the pointing device so that corresponding displacements are obtained; and a processor for controlling the object movement by different displacement output ratios according to different displacements comprising: an image displaying unit for displaying an object on the screen; a pointing device including a sensor, for sensing a change in a position of the pointing device to obtain a displacement; and a processor for controlling the object movement by different displacement output ratios according to the displacement, wherein a unit of the displacement corresponds to different units of the object movement under different displacement output ratio.

In the above method for controlling an object movement on a screen, the object is capable of moving by a very small unit, so that it can be positioned to a desired location precisely without requiring a high resolution pointing device.

The objectives, technical details, features, and effects of the present invention will be better understood with regard to the detailed description of the embodiments below, with reference to the attached drawings.

DESCRIPTION OF THE PREFERRED EMBODIMENTS

Figure 1:
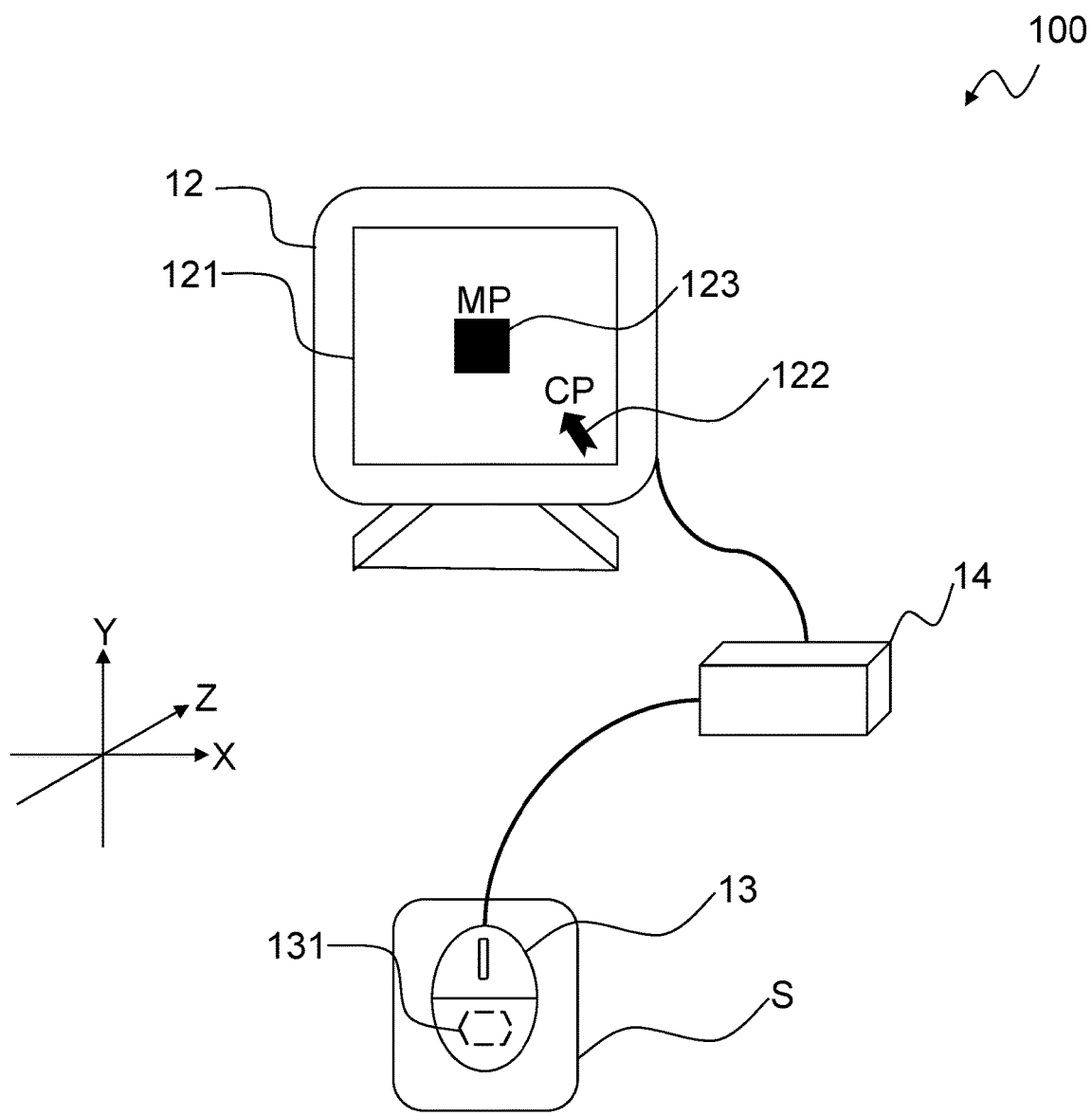
FIG. 1 shows a schematic view of an apparatus for controlling an object movement on a screen according to an embodiment of the present invention.
Figure 2:
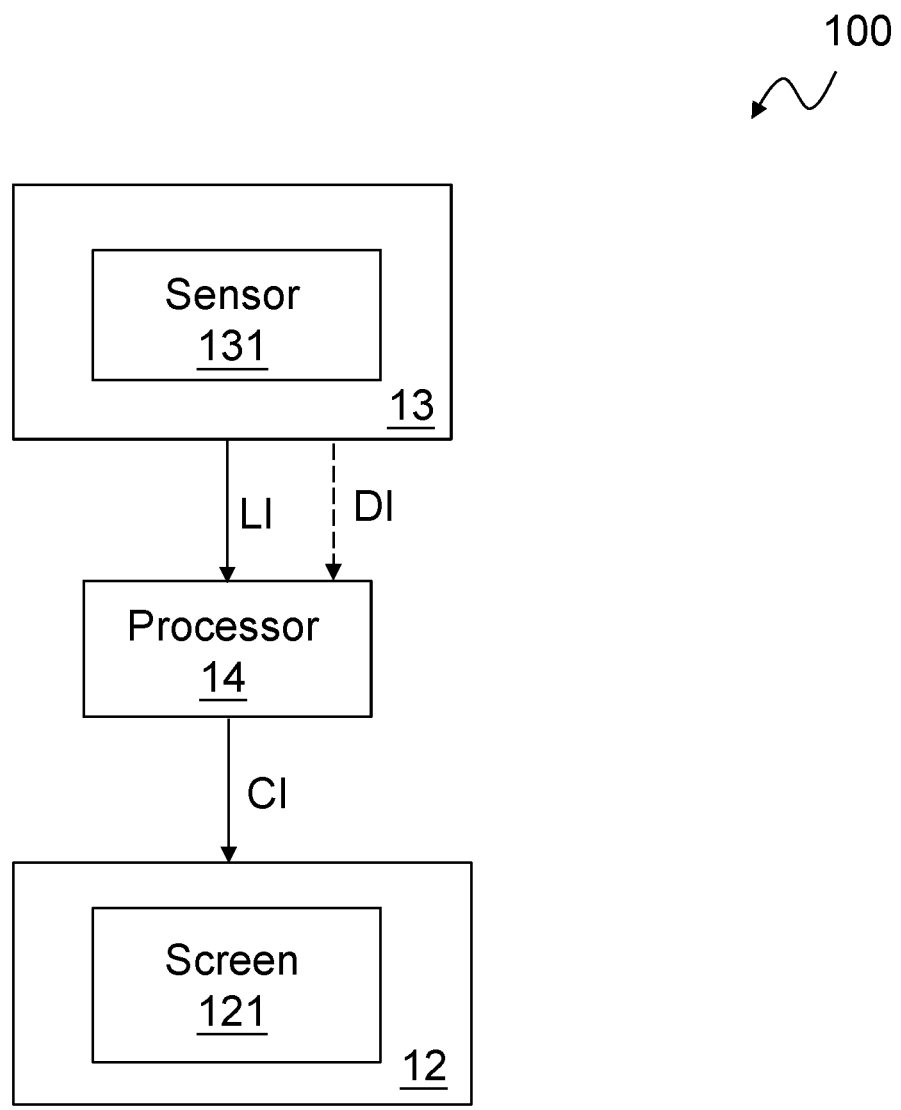
FIG. 2 shows a block diagram of an apparatus for controlling an object movement on a screen according to an embodiment of the present invention.

Please refer to FIG. 1 and FIG. 2, which show a schematic view and a block diagram of an apparatus for controlling an object movement on a screen according to an embodiment of the present invention, respectively. The apparatus 100 for controlling an object movement on a screen comprises an image displaying unit 12, a pointing device 13 and a processor 14. The image displaying unit 12 is for displaying an object such as a cursor 122 and a predetermined marker 123 on the screen 121. However, the cursor is just an example and the object is not limited to a cursor in other embodiments. The cursor 122 has a cursor position CP on the screen 121. The predetermined marker 123 has a marker position MP on the screen 121. The predetermined marker 123 is for example but not limited to an icon. The pointing device 13 includes a sensor 131. The sensor 131 is for sensing the absolute position or the relative position of the pointing device 13 and obtaining position information LI; or, in an alternative case, the sensor 131 is capable of sensing a relative movement of an object (e.g., a finger) relative to the pointing device 13 and obtaining position information LI according to the absolute position or the relative position of the object. The processor 14 calculates the displacement of the pointing device 13 according to the position information LI and generates control information CI so as to obtain the cursor position CP. In addition to generating position information LI and calculating the displacement according to the obtained position information LI, in alternative cases, to the sensor 131 can output the displacement information DI instead of the position information LI. In this embodiment, the image displaying unit 12 and the pointing device 13 are, for example but not limited to, a computer screen and a mouse, respectively. However, the image displaying unit 12 is not limited to a computer screen; it can also be a projector screen, a screen for a gaming machine, a PDA screen, a mobile phone screen, or any other apparatus for displaying images. The pointing device 13 is not limited to a mouse; it can also be a pen-type mouse, a touch panel, a trackball, a gaming controller, or any other inputting system or remote controller. In this embodiment, the pointing device 13 is capable of moving on a surface S to control the movement of the cursor 122 on the image displaying unit 12 correspondingly. The surface S can be, for example but not limited to, a mouse pad or a desktop, as shown in FIG. 1. In alternative embodiments, the pointing device 13 can be a remote controller capable of moving in a three-dimensional space and thus controlling the movement of the cursor 122 on the image displaying unit 12 in response to the change in position information LI caused by its three-dimensional or two-dimensional movement.

In this embodiment, the sensor 131 can be, for example but not limited to, a Complementary Metal-Oxide Semiconductor (CMOS) type image sensor or a Charge-Coupled Device (CCD) type image sensor. The sensor 131 is for capturing images generated by the pointing device 13 relative to the surface S to obtain the position information LI of the pointing device 13. The sensor 131 can generate the position information LI according to an absolute coordinate system or a relative coordinate system. In alternative embodiments, the pointing device 13 can generate the position information LI with other approaches instead of the optical approach. In addition, in certain applications, part of the calculating function can be integrated into the sensor 131; that is, in the pointing device 13, the sensor 131 is integrated with a processing circuit. In this case, the pointing device 13 can directly output the displacement information DI according to the position change between two successive images and the processor 14 can control the movement of the cursor according to the displacement information DI. The above-mentioned position information LI and displacement information DI can be two-dimensional information (as shown by the X and Y directions in FIG. 1), three-dimensional information (as shown by the X, Y and Z directions in FIG. 1), or any other type of information represented in other ways. For example, the position information LI and the displacement information DI can be expressed by an angular coordinate system, which includes, for example but not limited to, a one-dimensional displacement and a three-dimensional rotation angle. Moreover, although the image displaying unit 12, the pointing device 13 and the processor 14 are shown to be three separated units, they can be partially or wholly integrated together. For instance, the processor 14 can be integrated into the image displaying unit 12 or the pointing device 13. Or, a processing circuit can be disposed into the image displaying unit 12 or the pointing device 13, and a certain part of the function of the processor 14 can be performed by the image displaying unit 12 or the pointing device 13 (such scenario can also be regarded as some part of the processor 14 is disposed into image displaying unit 12 or the pointing device 13).

In this embodiment, the cursor 122 is expressed in the form of an arrow. Certainly, the form of the cursor 122 can be different in other embodiments, such as, for example but not limited to, an I-shape form, a cross-shape form, a palm-shape form, or any other forms. In this embodiment, the form of the predetermined marker 123 is illustrated as a square, and the marker position MP of the predetermined marker 123 is illustrated as being located in the central of the screen 121 for example. Certainly, in other embodiments, the form of the predetermined marker 123 can be any other forms, and the marker position MP of the predetermined marker 123 can be located in any other positions. In this embodiment, the image displaying unit 12 is wiredly or wirelessly coupled to the processor 14, and the processor 14 is wiredly or wirelessly coupled to the pointing device 13. If the communication is conducted wiredly (as shown in FIG. 1), a connection port (not shown) can be employed. The connection port (not shown) can be, for example but not limited to, an Universal Serial Bus (USB) interface or a PS2 interface. And, two connection wires are employed to couple the image displaying unit 12 with the processor 14 and to couple the processor 14 with the pointing device 13. If the communication is conducted wirelessly, the connection port (not shown) can be a wireless transmission module capable of transmitting wireless signals. The wireless signals can be received by wireless receivers (not shown) coupled to the image displaying unit 12, the pointing device 13 and the processor 14, respectively.

How the present invention dynamically adjusts the displacement output ratio and the cursor position in response to the user's operation will be better understood with regard to the detailed description of the embodiments below.

Figure 3:
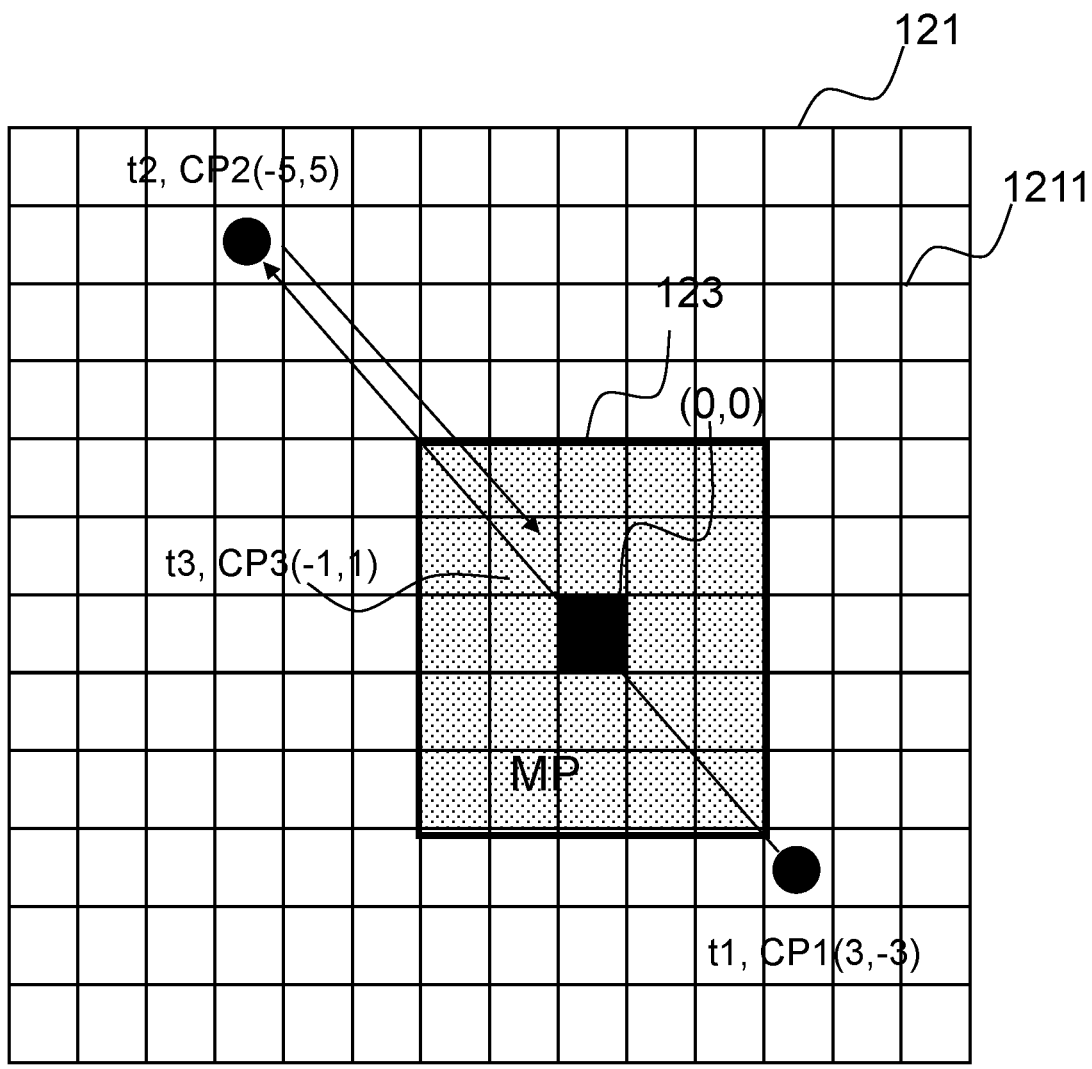
FIGS. 3-6 illustrate how the present invention dynamically adjusts the displacement output ratio and the cursor position in response to the user's operation.

Please refer to both FIG. 3 and FIG. 1. The screen 121 includes a two-dimensional planar coordinate system 1211. The center of the marker position MP of the predetermined marker 123 is assumed to have coordinates of (0, 0), and the marker position MP of the predetermined marker 123 is assumed to cover a 5×5 pixel area. The current time point is t1, and the cursor 122 has a current position of CP1 having coordinates of (3, −3). The user intends to move the cursor 122 to the position where the predetermined marker 123 is located; that is, the user intends to move the cursor 122 to any coordinates covered by the marker position MP. Nevertheless, the resolution of the pointing device 13 is lower than that of the screen 121, and the displacement ratio for the displacement of the pointing device 13 to the displacement of the cursor 122 on the screen 121 is, for example, 1:8. In other words, when the pointing device 13 moves by one unit, the cursor 122 correspondingly moves by eight units on the screen. Accordingly, although the user moves the pointing device 13 by one smallest unit from time point t1 to time point t2, the cursor 122 is moved to the position of CP2 having coordinates of (−5, 5).

Because the cursor 122 passes over the desired position, the user moves backward. Because the backward movement changes the displacement direction by an angle which exceeds a first angle threshold (to be explained in detail later; in this embodiment, the displacement direction is completely reversed, but this is only one possible scenario), the processor 14 accordingly adjusts the displacement ratio (hereinafter referred as "displacement output ratio") between the displacement of the pointing device 13 to the displacement of the cursor 122 on the screen 121. For instance, the displacement output ratio originally of 1:8 is adjusted to become 1:4 (note that the numbers are for example only, and the ratio can also be any other numbers). Because the displacement output ratio is adjusted, the cursor 122 now arrives at the position of CP3 having coordinates of (−1, 1) at the time point t3, which is within the range of the marker position MP. In this way, the present invention avoids the annoying situation that the user keeps moving back and forth repeatedly between CP1 (3, −3) and CP2 (−5, 5), but fails to reach the marker position MP.

Figure 4:
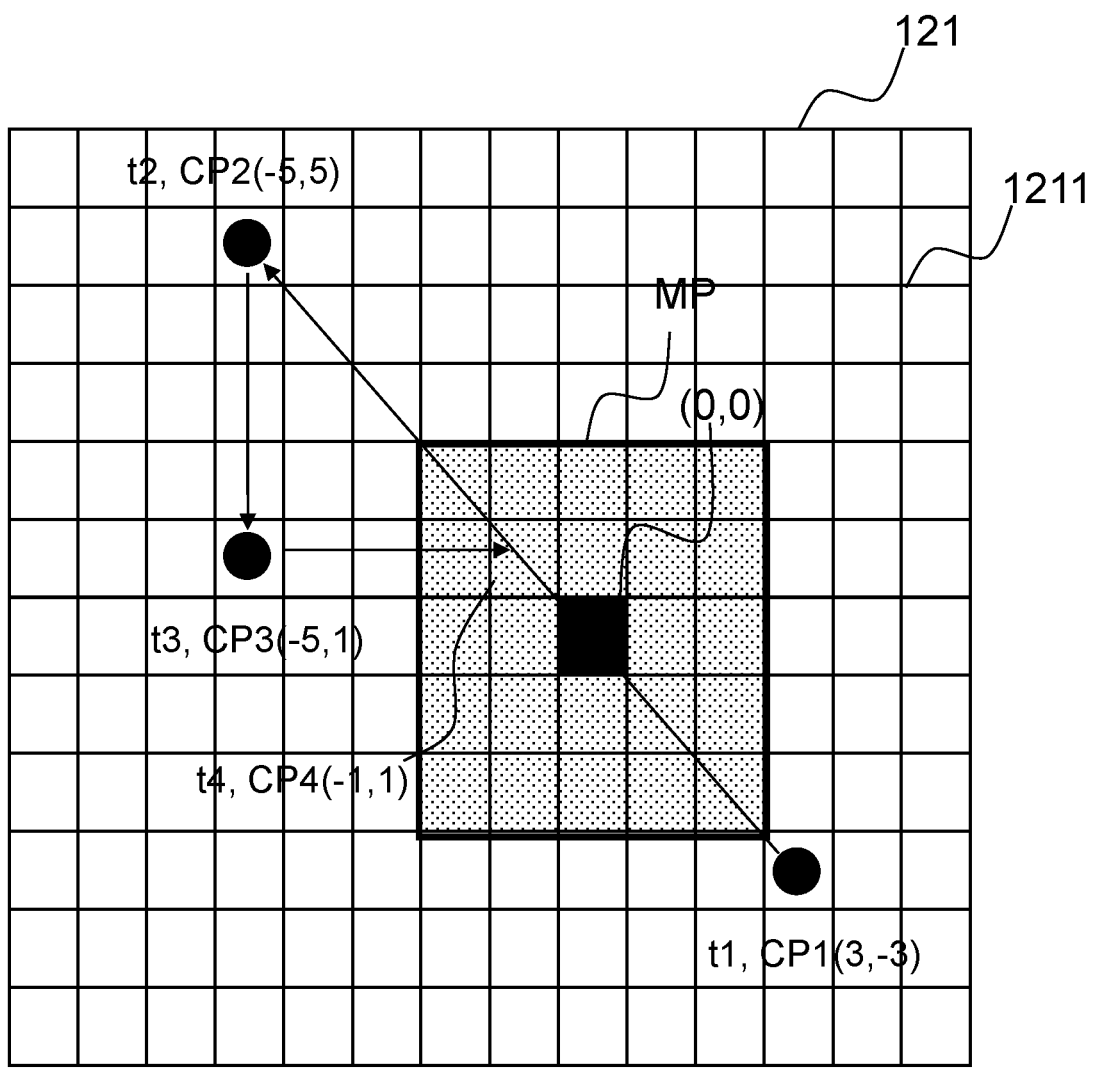

Please refer to FIG. 4. Although the user intends to move the pointing device 13 toward an opposite direction, the pointing device 13 may not be precisely moved toward that direction due to the user's imprecise operation. In this embodiment, after the user moves the pointing device 13 to the position of CP2, the user intends to move the pointing device 13 toward an opposite direction. However, because the user moves the pointing device 13 downward in a greater scale than rightward, the system judges the movement to be a downward movement, and the cursor 122 is moved to the position of CP3 having coordinates of (−5, 1) at the time point t3. This is fine because the user simply needs to move rightward after the cursor 122 is moved to the position of CP3. And, the processor 14 then still controls the displacement of the cursor 122 on the screen 121 with the displacement output ratio of 1:4, in response to the displacement of the pointing device 13. In other words, it can be so designed that the displacement output ratio is kept at the lower displacement output ratio for a time period after the change in displacement direction exceeds the first angle threshold, or as long as the pointing device 13 does not cease changing the outputted location information LI or displacement information DI.

The above mentioned criterion that "the change in displacement direction exceeds the first angle threshold" can be understood more easily from the perspective of angle. In the embodiment shown in FIG. 4, the angle difference between the movement direction from CP1 to CP2 and the movement direction from CP2 to CP3 is 135 degrees. Usually, if the angle in changing the displacement direction is smaller than or equal to 90 degrees, it is very likely that the user simply intends to make a turn. However, if the angle in changing displacement direction is larger than 90 degrees, it is very likely that the user intends to revise his or her previous displacement. Accordingly, in an embodiment of the present invention, the first angle threshold is set as 90 degrees. When the change in displacement direction exceeds this first angle threshold, the above-mentioned displacement output ratio is adjusted lower. Certainly, the above-mentioned number of "90" is not for limitation purpose and can be adjusted depending on practical needs.

In addition, that "the change in displacement direction exceeds the first angle threshold" does not necessarily need to be calculated from the perspective of the angle; it can be calculated from the perspective of the change in the direction of each individual dimension. In the embodiment shown in FIG. 4, when the user moves from CP1 to CP2 and from CP2 to CP3, the movement in Y-axis is correspondingly changed from the positive Y-direction to the negative Y-direction. Thus, the change in displacement direction can be determined as follow: when the processor 14 judges that in any one (or more) of the dimensions, the direction of the displacement is changed to an opposite direction, the above-mentioned displacement output ratio is adjusted lower. If the position information LI or the displacement information DI is represented by other forms (e.g., by the angular coordinate system as described above), the principle is unchanged to determine whether the change in displacement direction exceeds the first angle threshold, but the calculation can be correspondingly adjusted depending on the coordinate system, to determine whether the user simply intends to make a turn or the user intends to revise his or her previous displacement.

Figure 5:
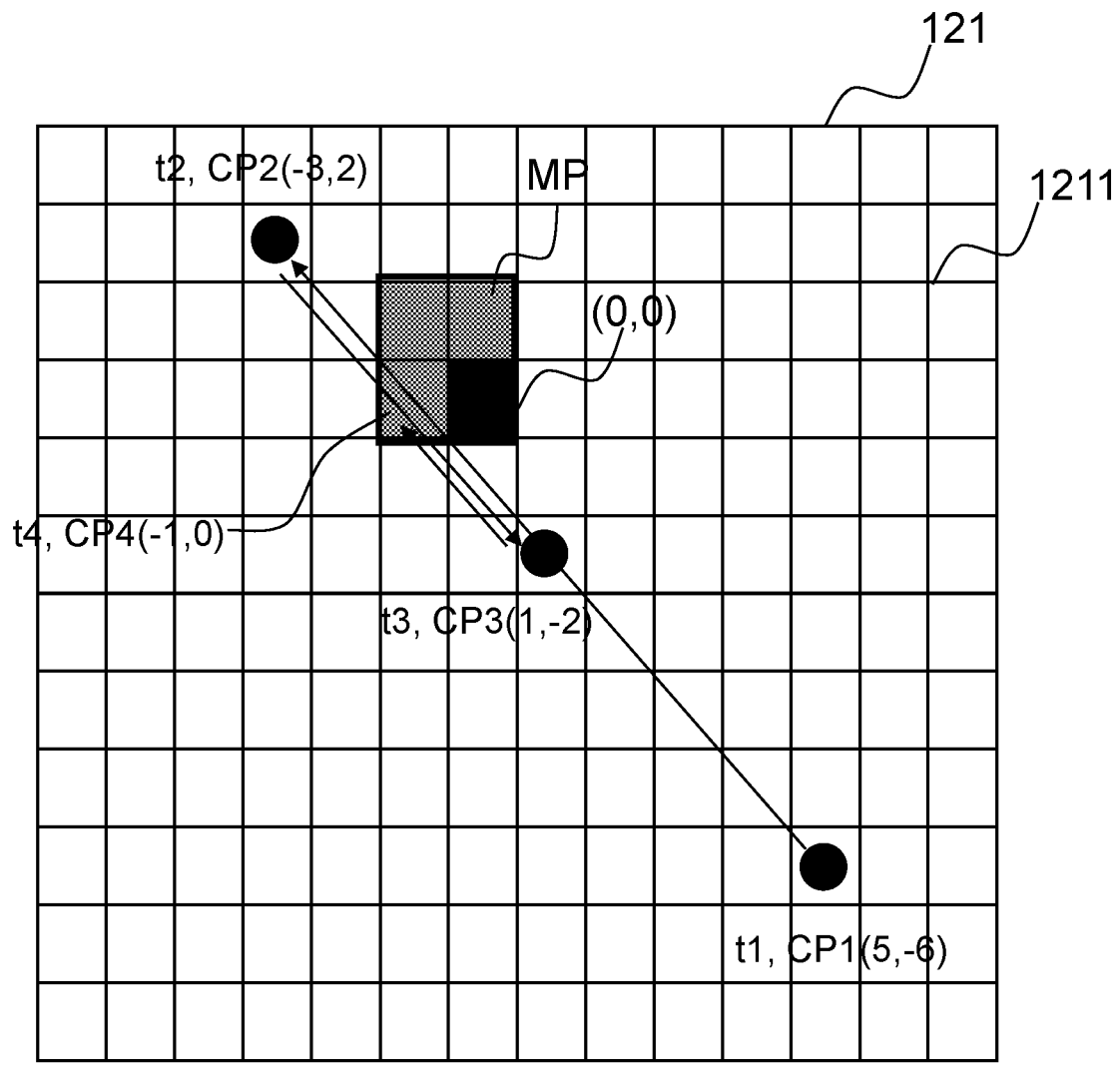

Please refer to FIG. 5, which illustrates another embodiment. In this embodiment, the marker position MP of the predetermined marker 123 is assumed to cover a much smaller pixel area (e.g., a 2×2 pixel area). Under such circumstance, although the displacement output ratio is adjusted from 1:8 to 1:4, the cursor 122 may still be unable to be positioned within the range of the marker position MP. According to the present invention, if the user changes the displacement direction for a second time within a predetermined time period, and if the change in displacement direction exceeds a second angle threshold (this second angle threshold can be equal to or different from the above-mentioned first angle threshold), the displacement output ratio can be adjusted further lower. For example, the displacement output ratio is further adjusted from 1:4 to 1:2 in the embodiment shown in FIG. 5. More specifically, the displacement output ratio from CP1 to CP2 is 1:8; the displacement output ratio from CP2 to CP3 is 1:4; the displacement output ratio from CP3 to CP4 is 1:2. Certainly, the displacement output ratio can be adjusted by more step levels such as from 1:8 to 1:6, and then from 1:6 to 1:4, and then from 1:4 to 1:2, and then from 1:2 to 1:1.

Figure 6:
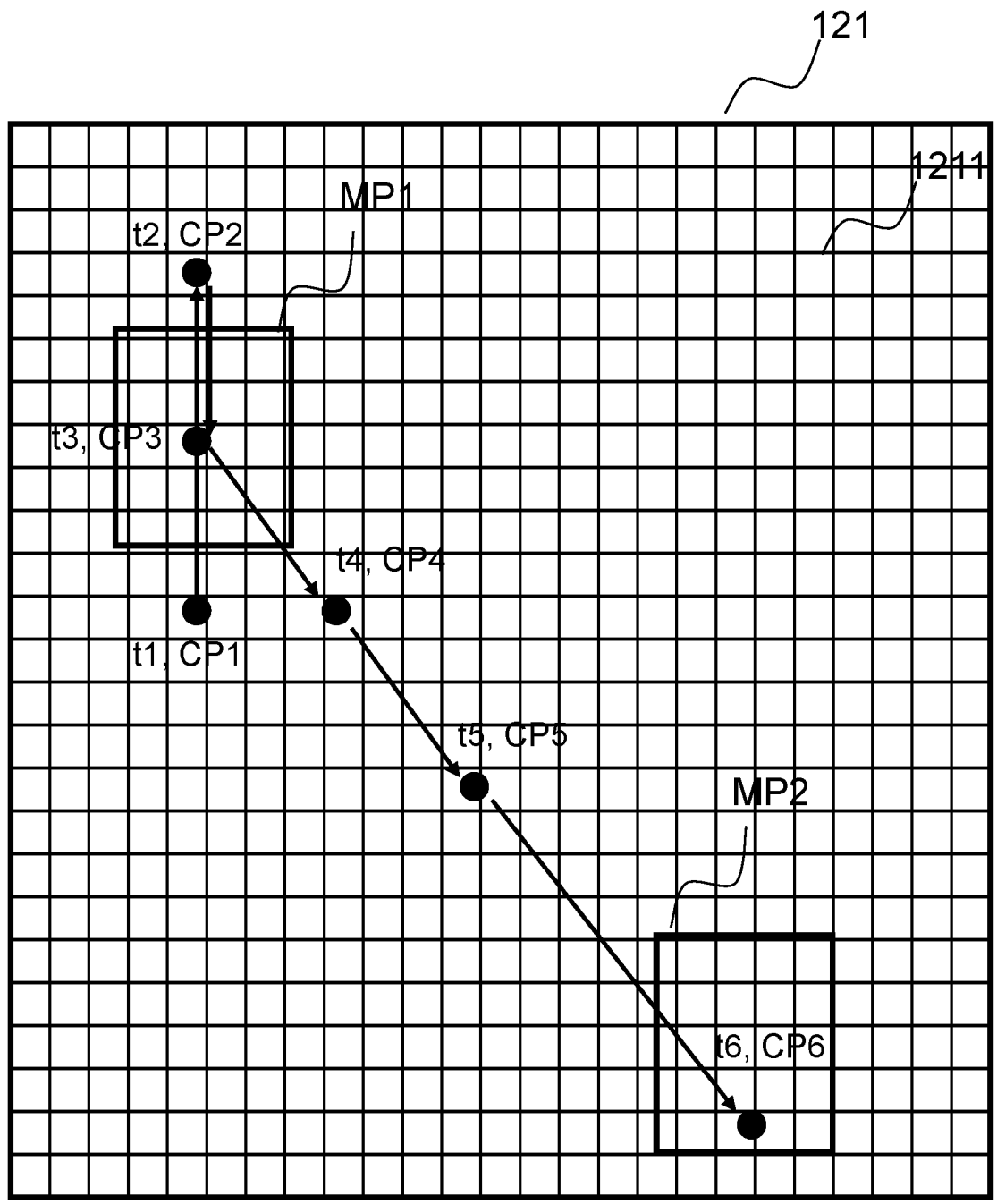

Please refer to FIG. 6, which illustrates yet another embodiment. In this embodiment, the screen 121 includes two predetermined markers having the marker positions MP1 and MP2, respectively. From time point t1 to time point t2, the displacement output ratio from CP1 to CP2 is 1:8. From time point t2 to time point t3, the displacement output ratio from CP2 to CP3 is 1:4 because the criterion for adjusting the displacement output ratio is met. The displacement output ratio from CP3 to CP4 and from CP4 to CP5 remains to be 1:4. This embodiment is to demonstrate that: after the displacement output ratio is adjusted lower, it can be adjusted back to the previous higher displacement output ratio when certain condition(s) is/are met, as shown by the movement from CP5 to CP6. For example, the conditions may be one or more of the followings: (1) when the user stops at the position of CP5 (i.e., the position information LI or the displacement information DI outputted by the pointing device 13 ceases changing within a predetermined time period); (2) when the user inputs other control information (e.g., pushing down the button of the mouse), such that the processor 14 receives this other control information which is not the position of the pointing device 13; (3) when the time that the displacement output ratio remains at a lower number reaches to a predetermined time threshold (e.g., the time for moving from CP2 to CP5 in this embodiment); (4) when the pointing device 13 continually moves toward substantially the same direction for a predetermined time period (e.g., the movement from CP3 to CP5 in this embodiment). The term "substantially the same direction" may be determined according to whether the change in displacement direction is within a certain angle threshold (e.g., equal to or smaller than 90 degrees).

Certainly, if the displacement output ratio is adjusted lower by multiple step levels, it can be adjusted back also step by step, or adjusted back to the original displacement output ratio by one step.

According to the present invention, by dynamically adjusting the displacement output ratio, the resolution of the pointing device 13 can be far less than that of the screen 121, and therefore the cost of the pointing device 13 can be reduced.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the adjustment of the displacement output ratio can also be design as follow: after the processor decreases the displacement out ratio, the processor will not decrease the displacement out ratio for the second time. In view of the foregoing, the spirit of the present invention should cover all such and other modifications and variations, which should be interpreted to fall within the scope of the following claims and their equivalents.

What is claimed is:

1. A method for controlling a position of a cursor on a screen, comprising;
  receiving first moving information regarding a cursor control function to control a movement of the cursor, wherein the first moving information indicates a first end position;
  receiving second moving information regarding the cursor control function to control the movement of the cursor, wherein the second moving information is generated after the first moving information, and the second moving information indicates a second end position;
  locating the cursor at an actual end position which is located between the first end position and the second end position instead of locating at the second end position under a premise condition that the first moving information or the second moving information indicates a movement of one smallest unit and that a difference between a direction of the first moving information and a direction of the second moving information exceeds an angle threshold.

2. The method of claim 1, further comprising: before receiving the first moving information, receiving third moving information regarding the cursor control function to control the movement of the cursor, wherein a difference between a direction of the first moving information and a direction of the third moving information exceeds the angle threshold.

3. The method of claim 1, wherein the first moving information includes a 2-dimensional vector and the second moving information includes a 2-dimensional vector, and wherein the difference between a direction of the first moving information and a direction of the second moving information exceeding an angle is determined by checking whether, in at least one of the dimensions, the 2-dimensional vector of the second moving information has an opposite direction as compared to the 2-dimensional vector of the first moving information.

4. The method of claim 1, wherein the angle threshold is equal to or larger than 90 degrees.

5. A cursor displaying system, comprising:
a display for displaying a cursor;
a receiver for receiving at least first and second moving information generated at different time points, wherein the first moving information indicates a first end position and the second moving information indicates a second end position, and wherein the second moving information is generated after the first moving information; and
a processor for locating the cursor at an actual end position which is located between the first end position and the second end position instead of locating at the second end position under a premise condition that the first moving information or the second moving information indicates a movement of one smallest unit and that a difference between a direction of the first moving information and a direction of the second moving information exceeds an angle threshold.

6. The cursor displaying system of claim 5, wherein the receiver further receives third moving information before receiving the first moving information, wherein a difference between a direction of the first moving information and a direction of the third moving information exceeds the angle threshold.

7. The method of claim 5, wherein the first moving information includes a 2-dimensional vector and the second moving information includes a 2-dimensional vector, and wherein the difference between a direction of the first moving information and a direction of the second moving information exceeding an angle is determined by checking whether, in at least one of the dimensions, the 2-dimensional vector of the second moving information has an opposite direction as compared to the 2-dimensional vector of the first moving information.

8. The method of claim 5, wherein the angle threshold is equal to or larger than 90 degrees.

9. A method for controlling a position of a cursor on a screen, comprising;
receiving first moving information regarding a cursor control function to control a movement of the cursor, wherein the first moving information includes a first 2-dimensional vector;
receiving second moving information regarding the cursor control function to control the movement of the cursor, wherein the second moving information is generated after the first moving information, and the second moving information includes a second 2-dimensional vector which has a start position and an end position;
locating the cursor at an actual end position which is located between the start position and the end position of the second 2-dimensional vector instead of locating at the end position of the second 2-dimensional vector under a premise condition that the first moving information or the second moving information indicates a movement of one smallest unit and that a difference between a direction of the first moving information and a direction of the second moving information exceeds an angle threshold.

10. The method of claim 9, further comprising: before receiving the first moving information, receiving third moving information regarding the cursor control function to control the movement of the cursor, wherein a difference between a direction of the first moving information and a direction of the third moving information exceeds the angle threshold.

11. The method of claim 9, wherein the difference between a direction of the first moving information and a direction of the second moving information exceeding an angle is determined by checking whether, in at least one of the dimensions, the second 2-dimensional vector has an opposite direction as compared to the first 2-dimensional vector.

12. The method of claim 9, wherein the angle threshold is equal to or larger than 90 degrees.

13. A cursor displaying system, comprising:
a display for displaying a cursor;
a receiver for receiving at least first and second moving information generated at different time points, wherein the first moving information includes a first 2-dimensional vector and the second moving information includes a second 2-dimensional vector which has a start position and an end position, and wherein the second moving information is generated after the first moving information; and
a processor for locating the cursor at an actual end position which is located between the start position and the end position of the second 2-dimensional vector instead of locating at the end position of the second 2-dimensional vector under a premise condition that the first moving information or the second moving information indicates a movement of one smallest unit and that a difference between a direction of the first moving information and a direction of the second moving information exceeds an angle threshold.

14. The cursor displaying system of claim 13, wherein the receiver further receives third moving information before receiving the first moving information, wherein a difference between a direction of the first moving information and a direction of the third moving information exceeds the angle threshold.

15. The method of claim 13, wherein the difference between a direction of the first moving information and a direction of the second moving information exceeding an angle is determined by checking whether, in at least one of the dimensions, the second 2-dimensional vector has an opposite direction as compared to the first 2-dimensional vector.

16. The method of claim 13, wherein the angle threshold is equal to or larger than 90 degrees.

* * * * *